(No Model.)
C. J. MULFORD.
CHOCOLATE POT.
No. 463,335. Patented Nov. 17, 1891.
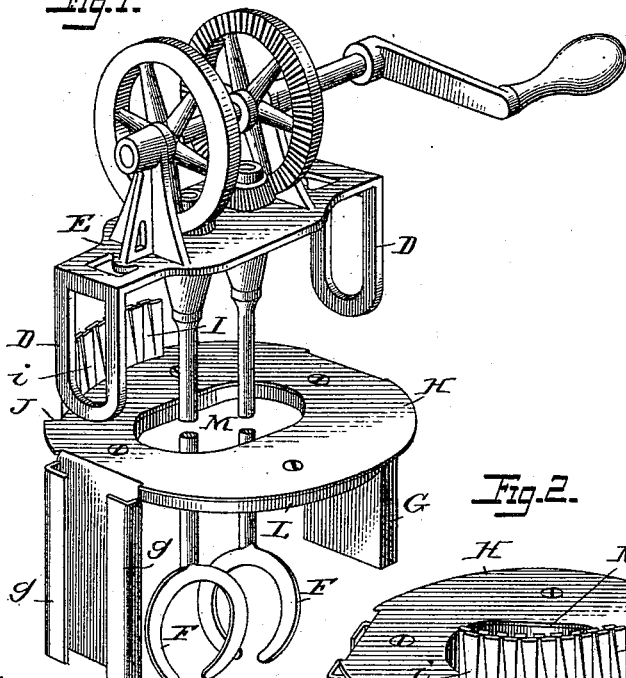
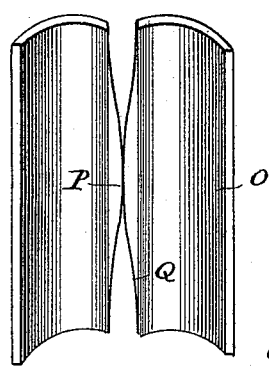
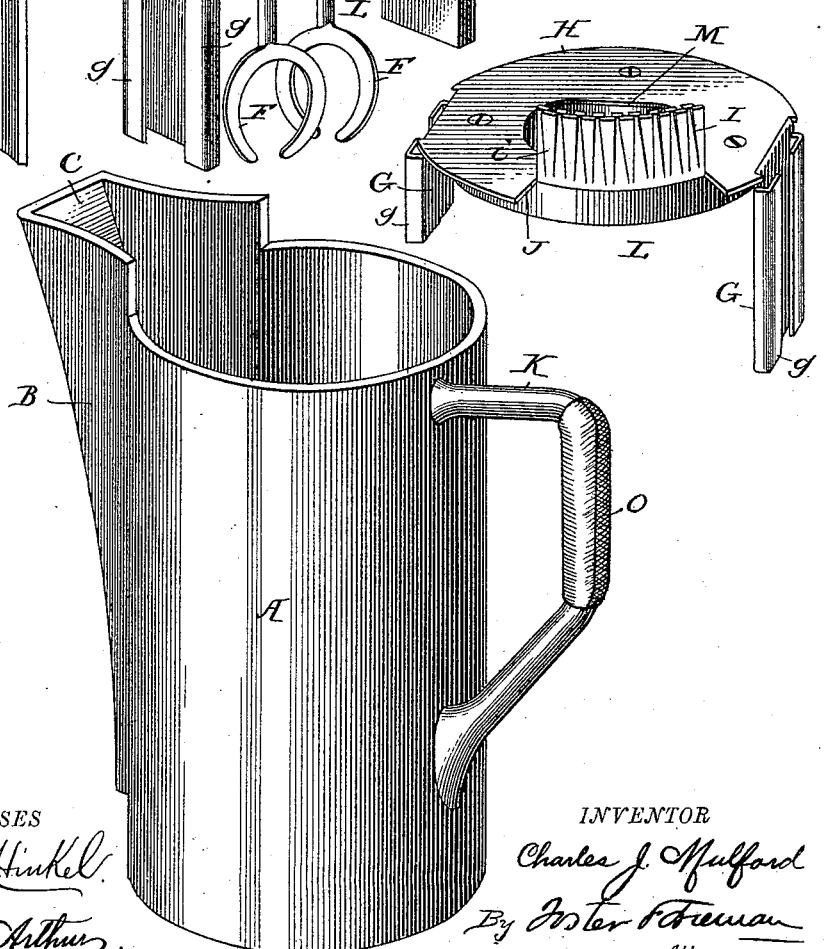
WITNESSES
Jno. G. Hinkel
H. S. McArthur
INVENTOR
Charles J. Mulford
By Foster Freeman
Attorneys

UNITED STATES PATENT OFFICE.

CHARLES J. MULFORD, OF NEW YORK, N. Y.

CHOCOLATE-POT.

SPECIFICATION forming part of Letters Patent No. 463,335, dated November 17, 1891.

Application filed December 19, 1890. Serial No. 375,903. (No model.)

*To all whom it may concern:*

Be it known that I, CHARLES J. MULFORD, a citizen of the United States, residing in the city, county, and State of New York, have invented certain new and useful Improvements in Chocolate-Pots, of which the following is a specification.

In my former patents, Nos. 411,870, 430,783, and 430,784, and application Serial No. 375,904, filed December 19, 1890, for improvements in chocolate-pots, I have shown and described the pot as being made of metal; but I find that I can also adapt my improvements to pots made of earthenware, stoneware, porcelain, china, yellow-stone, &c. As the general shape of the pot is the same as those shown in said former patents and applications, the present application relates more particularly to the adaptation of my improved puddlers to the pot and the formation of the pot to adapt it to receive the puddlers; and it also relates to an improved non-heat-conducting clasp or lift, whereby the pot may be manipulated without danger of its burning the operator or of slipping out of the grasp.

In the accompanying drawings, in which the same reference-letters indicate corresponding parts in each of the figures, Figure 1 is a perspective view of a pot with my new removable cover in position to be applied thereto, with the puddlers partly in position. Fig. 2 is a perspective view of the cover detached, and Fig. 3 is a detail view of my improved clasp or lift.

In constructing an earthenware pot A, it should only be made so thick or heavy as to give it the proper strength to prevent its being easily broken in use and should be of any suitable size, and is preferably made about as deep again as it is broad, as this I find gives the most desirable results, such as room for the foam, ease or promptness in cooking, &c. It is preferably made with a flat bottom and is provided with my improved square open-mouthed spout B, as described more particularly in my former application. The spout is provided with my improved extension C, except that the rear wall is omitted, owing to its cost and frangibility. The rear wall, however, is supplied by a wall or levee on the cover, as will be hereinafter more particularly explained.

As it is practically impossible to provide the pot with ears for the reception of the legs D of the frame E for the puddlers F, it is necessary that some means be provided for receiving them and holding the frame in position while the puddlers are being operated during the making or preparation of the chocolate. I accomplish this by securing the ears G to the sides or edges of the cover H, or by forming them with the latter, whereby they will project down at the sides of the pot when the cover is put in place. The ears are preferably formed by turning the edges *g* over upon the outside of the ears to form a slot or channel for the legs, and of course must be of such a width and depth as to hold the legs of the frame firmly and prevent movement of the puddlers while they are being operated. In addition to the ears the cover is provided with the foam-levee I, which is just wide enough and high enough to fit in the rear part of the spout-extension and complete it in the same manner as though the extension were made of metal or earthenware entire. This levee can be made of a separate piece and be secured to the edge of the cover in any suitable manner, although I prefer to form it by bending up a portion of the edge, which is left projecting when the cover is cut or formed. As the vertical edges of the levee are preferably made straight, and as there is more metal in the circular flat piece of the cover than is needed to form the levee, it is best to cut the projecting portion into narrow strips *i*, which can be overlapped at their tops and soldered or otherwise secured into a solid wall. The edge of the cover at this point is provided with a notch J, which engages with the sides of the spout-extension and prevents the cover from moving around on top of the pot, and is preferably made at such a point in relation to the ears that when upon the pot the frame for the puddlers will stand at an angle to a line drawn from the handle to the tip of the spout-extension. This causes the crank of the puddlers to stand nearer the handle K of the pot than to the spout, whereby it can be more easily operated, and at the same time the operator can keep his eye upon the spout to see when the foam rises in the spout to indicate whether the chocolate has been sufficiently cooked or not.

The under side of the cover H is provided with an annular ring L, of wood or other suitable material, which will fit within the top of the pot and assist in keeping it from moving; and it will also act as a guard or cushion in putting the cover upon the pot and thereby prevent the liability of breaking the frangible earthenware by contact with the hard metallic cover. The size of the wooden block is such that it will fit within the top of the pot, which will thus leave a space or channel between its periphery and the downturned ears just the thickness of the wall of the pot, which is preferably about half an inch.

An oval opening M is made through the cover and block through which the puddlers project in the same manner as is fully described in my former application. As the puddlers are the same as are described in my former application, and in fact are to be made interchangeable from a metal to an earthenware pot of the same size, &c., I have not given a more complete description of their construction and operation in this application.

The handle K for lifting the pot is best made solid or integral with the pot, and it is therefore necessary to provide it with a lift or covering O of some poor heat-conducting material, as wood, ivory, &c. As I prefer to make it removable, it is best made of two pieces of suitable size and shape and joined together by means of a hinge P, whereby they may be clasped around the handle of the pot and held in the hand of the operator. I prefer to form this hinge in the nature of a spring Q, which will have a tendency to hold the two parts of the handle together, so that they can be opened and sprung around the handle of the pot and will stay there until they are sprung apart and taken off. Of course this handle can be made plain or as ornamental as desired, and any kind of suitable spring may be used, although I prefer the one shown in the drawings, as it is simple and very effective, consisting of two pieces of spring metal with their ends secured to the opposite parts of the handle and joined together at or near their centers, so as to act as torsion-springs.

It is evident that my improved cover can be applied to a pot made of metal, as well as of earthenware, &c., and the clasp can be used upon a handle made of a hollow metal rod filled with non-heat-conducting material, the same as I have shown and described in my former applications. I also reserve the right to make such other changes or alterations in the size and dimensions in all of my improvements as may be resorted to without departing from the spirit of my invention.

Having thus described my invention, I claim—

1. The combination, with the open-mouth pot having a spout-extension, of a cover having an opening for the puddlers and provided with the foam-levee for the spout, substantially as described.

2. The combination, with the cover of a pot having a central opening and provided with ears, of a frame having legs fitting the ears and provided with puddlers and means for operating them, substantially as described.

3. The combination, with an open-mouth pot, of a cover having ears fitting the outside edge of the mouth and provided with a guard fitting the inner edge of the mouth, substantially as described.

4. The combination, with an open-mouth chocolate-pot having a spout-extension, of a cover having a central opening and provided with ears and a foam-levee, and a frame carrying the puddlers, and means for driving them, and having legs fitting the ears of the cover, substantially as described.

In testimony whereof I have signed my name to this specification in the presence of two subscribing witnesses.

CHARLES J. MULFORD.

Witnesses:
EDWD. K. ANDERTON,
LOUIS F. GOLDMANN.